United States Patent
Stull

(10) Patent No.: US 11,282,096 B2
(45) Date of Patent: Mar. 22, 2022

(54) METHODS AND SYSTEMS FOR COLLECTING SURVEY FEEDBACK DATA

(71) Applicant: Capital One Services, LLC, McLean, VA (US)

(72) Inventor: Elijah Stull, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/778,675

(22) Filed: Jan. 31, 2020

(65) Prior Publication Data

US 2021/0241296 A1     Aug. 5, 2021

(51) Int. Cl.
*G06Q 30/02*     (2012.01)
*G06F 9/54*     (2006.01)
*G06F 16/9535*     (2019.01)

(52) U.S. Cl.
CPC ......... *G06Q 30/0203* (2013.01); *G06F 9/547* (2013.01); *G06F 16/9535* (2019.01); *G06Q 30/0245* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 2015/0220942 A1* | 8/2015 | Dubberley | G06Q 30/0201 705/7.29 |
| 2016/0104177 A1* | 4/2016 | Bridwell | G06Q 30/0203 705/7.32 |

OTHER PUBLICATIONS https://tinypulse.com, Nov. 21, 2019.
https://usabilla.com, Jan. 30, 2020.
https://www.medallia.com, May 24, 2019.
https://www.surveymonkey.com, Jan. 30, 2020.
https://ww9.qualtrics.com, Jan. 30, 2020.

* cited by examiner

*Primary Examiner* — Kurtis Gills
(74) *Attorney, Agent, or Firm* — DLA Piper LLP US

(57) ABSTRACT

Methods and systems for collecting feedback data. An application programming interface (API)-based survey feedback dashboard can be prepared for storing survey feedback data for an API-based survey, the API-based survey feedback dashboard capable of collecting survey feedback data comprising single choice feedback data, multi choice feedback data, or free form feedback data, or any combination thereof. A universally unique identifier (UUID) that links survey meta information and/or survey structural information with incoming survey feedback data can be generated, such that the UUID is available using the API. The survey feedback data can be collected using the API and the UUID.

21 Claims, 15 Drawing Sheets

REVERB

ABOUT   HOW TO   NEWSFEED   [ DASHBOARD ]

Discover Reverb

Discover all the ways Capital One's in-house feedback collections tool can help you better gauge customer loyalty, identify potential issues, improve product functionality, and build customer relationships— all in real time.

[ Get Started ]   [ Learn More ]

Engage Customer  ①  —— Capture Feedback ② —— Improve Product ③

Engage your customers with Reverb to gather invaluable feedback

Capture and review customer feedback through a variety of analytical tools

Use real-time analytics and communication to improve products and services

Meet the Team

Eli
Product Manager

Connor
Product Owner

Jessica
UI Designer

FEEDBACK

How can we help you?

[ ✹ Slack Us ]   [ ✉ Email Us ]

Fig 5

Newsfeed

Home › Newsfeed

What's new with Reverb?

We've been hard at work designing and developing out new dashboard. Feel free to check it out and drop us a thought with our feedback button.

The Capital One Survey Builder - We're excited to introduce our fully customizable survey builder. In addition to the Net Promoter Score (NPS) and System Usability Scale (SUS) self-serve features, we've also included the following question types: drop down, open ended, yes/no, multiple choice, and single choice. This new survey builder greatly increases your survey's speed to market, gives time back to the Reverb team to work on customer requested enhancements, and gives you complete control over the entire survey experience from creation to delivery.

Survey anonymity – We have heard you and have made available a survey anonymity option during the survey creation process. If this option is selected, users taking your survey will be 100% anonymous to you while not taking away from being able to view which questions you asked and their responses.

Access control – With Reverb's customer base rapidly expanding, we rolled out access control to ensure product/survey security on our platform. This security feature requires users to request access for individual surveys. There are two types of access – a read-only and admin. Admin access will be able to view and respond to customer feedback on Reverb's dashboard. Read-only will only be able to view that particular survey's data on the dashboard. This will give you ownership over your survey(s) and ensure that only those approved can view or respond to your customer feedback on our dashboard. We will work with folks to provide initial access but will hand off governance to survey admins shortly after to avoid impeding on your work and provide a better self-serve experience.

Reply to user feedback – Now with admin access you can respond to individual feedback responses either if you would like to ask the respondent to elaborate further or just thank them for leaving a positive review.

- Export data - We're working to create an Export Data button directly on the dashboard so users can quickly and conveniently download their survey results to a CSV file.
- Automatic access – Survey creators will automatically gain access to their surveys and will no longer have to request access for those surveys that they've created.
- Contact list manager – ability to upload/modify recipient lists and send surveys from Reverb platform. From this feature you'll be able to track additional metrics such as response related, who has/hasn't responded to a particular survey, and ability to send out reminders to those who haven't responded.
- Filters on dashboard – There are numerous filters we're excited about adding to our dashboard. Filtering by survey type, survey score, user name or feedback timestamp to name a few.

Fig 7

Frequently Asked Questions

When is the best time to send a survey?
Monday! Read why...

---

Should I send a reminder?
Of course! 2-3 reminders is the sweet spot for response without agitating the recipient.

---

When is the best time to send reminders?
The best time to send reminders is Tuesday – Thursday either late morning or early afternoon.

---

For Net Promoter Score collection should I use 5 or 10 point scale?
It's recommend to use the 5 point scale to align with the corporate standard.

---

730

How to request Access?
Once you've created a survey follow these steps.
1. From the dashboard homepage search for your team name
2. Locate which product you wish to request access to and click on "Request Access"
3. Select either Read Only or Admin access, fill out a brief description of why you need access, and click submit!

---

How to reply to user feedback?
As long as you have admin access to your product you may reply to user feedback.
Follow these steps to use this feature:
1. Navigate to your products' feedback tab
2. Select the particular feedback response you wish to reply to
3. Click the "Reply" link in the bottom left
4. Write your response and click reply!
This will send an automated email notification to that user, in real time, letting them know you've responded to their feedback with their initial comment and your response.

735

FEEDBACK

Food for Thought

| 7 Reasons Why Customer Feedback is Important | 8 Lessons in Entrepreneurship & Leadership | Increase Your Reponses Rates |
|---|---|---|
| Discover the many benefits of customer feedback. | Check out Lesson 5 from our CEO, Richard Fairbank. | 10 Ways to Enhance Your Survey Response Rate. |
| View Article | View Article | View Article |
| 9 Ways to Successfully Manage Customer Feedback | 6 Email Subject Line Strategies to Increase Your Survey Feedback | How to Write a Good Customer Feedback Survey |
| Dive into how to make the most out of your feedback. | Dig deeper into the golden rules for a fool-proof subject line. | Guide to show how to boost the quality/quantity of responses. |
| View Article | View Article | View Article |

Fig 7 (Cont'd)

REVERB

ABOUT   HOW TO   NEWSFEED   ( DASHBOARD )

About

Home › About

805

What is Reverb?

Reverb is a brand new feedback management tool designed to provide powerful insights into customer satisfaction and product functionality. Developed in-house, Reverb offers real-time information and analyses that can help you better gauge customer loyalty, improve product performance, and build customer relationships.

Why Collect Feedback?

Customer feedback is an important communication tool that can open a dialogue between you and your customers. A user-friendly interface combined with prompt, personalized responses serves to enhance provider/customer relationships and helps to ensure the continual improvement of your product or service. Customer feedback acts as an early warning system, alerting you to problems customers are experiencing, giving you the opportunity to resolve those problems quickly and efficiently.

How Does it Work?

Reverb's flexibility offers different avenues for implementation. You can add our code snippet to your webpage or email. Or you could call our API (available on DevExchange Inside) from your application. Once in place, you can open a two-way dialogue on Reverb's platform where a Product Owner/Technical owner can respond to customer feedback.

Best Practices

FEEDBACK

Get Feedback
Get feedback as close to the interaction as possible while using real-time notifications

Send Follow up
Send a follow up with a thank you and follow up question within 24 hours of submission

Publish Learnings
Publish learnings to the customer base to show that you are listening How can we help ?

[ Slack Us ]  [ Email Us ]

Snowflake Test

1. How likely are you to recommend Snowflake Test to a colleague?*

○    ○    ○    ○    ○
1     2     3     4     5

*Not Likely*            *Extremely Likely*

[Submit]

METHODS AND SYSTEMS FOR COLLECTING SURVEY FEEDBACK DATA

FIELD

The present disclosure relates generally to collecting survey feedback data.

BACKGROUND

There is a need to collect survey data in more than one type of format.

SUMMARY

According to some aspects of the disclosure, a computer-implemented method can be provided for collecting survey feedback data. An application programming interface (API)-based survey feedback dashboard can be provided for storing survey feedback data for an API-based survey. The API-based survey feedback dashboard can be capable of collecting survey feedback data comprising open-ended API survey feedback data. A link can be sent to the API-based survey feedback dashboard to a user providing the survey feedback data. The survey feedback data can be collected from the user using the link to the API-based survey feedback dashboard.

According to aspects of the disclosure, a system for collecting feedback data can be provided that includes a memory storing instructions; and a processor for executing the instructions. The processor can be configured for: preparing an application programming interface (API)-based survey feedback dashboard for storing survey feedback data for an API-based survey, the API-based survey feedback dashboard capable of collecting survey feedback data in any computer format; sending a link to the API-based survey feedback dashboard to a user providing the survey feedback data; and collecting the survey feedback data from the user using the link to the API-based survey feedback dashboard.

According to aspects of the disclosure, a computer-implemented method can be provided for collecting survey feedback data. An application programming interface (API)-based survey feedback dashboard can be provided for storing survey feedback data for an API-based survey. The API-based survey can include parameters that are used in the API-based survey feedback dashboard. The API-based survey feedback dashboard can be capable of collecting survey feedback data comprising open-ended API survey feedback data. A link can be sent to the API-based survey feedback dashboard to a user providing the survey feedback data. The survey feedback data can be collected from the user using the link to the API-based survey feedback dashboard.

According to aspects of the disclosure, the API-based survey can include parameters that are used in the API-based survey feedback dashboard. The parameters can include: entity name, product or service name, user computer parameters, or feedback parameters, or any combination thereof.

According to aspects of the disclosure, data in any computer format can be collected from the API-based survey. A survey creator can manage a look and feel of the API-based survey feedback dashboard. The survey feedback data can include: net promoter score (NPS) data, average ratings data, yes/no data; thumbs up/thumbs down data, multiple choice data; or drop down choice data; or any combination thereof. An API-based survey feedback dashboard can be created for each product and/or service. The survey feedback data can be received and it can be determined that an API-based survey feedback dashboard has not been created for the survey feedback data for a survey.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 5 illustrates an example screen shot that can provide educational information on a feedback collection tool, according to some embodiments of the present disclosure.

FIG. 7 is an example screen shot related to a net promoter score (NPS) and/or system usability scale (SUS) self-serve features, according to some aspects of the present disclosure.

FIG. 8 is an example screen shot that provides users additional information on a dashboard, according to some aspects of the present disclosure.

FIG. 9 is an example screen shot that shows an example API-based survey feedback dashboard for storing survey feedback data for an API-based survey, according to some aspects of the present disclosure.

FIG. 10 illustrates an example link to an example survey that can be generated with survey information, according to some aspects of the present disclosure.

FIG. 12 illustrates an example of a survey creation screen shot, according to some aspects of the present disclosure.

FIG. 13 illustrates an example of a survey dashboard screen shot, according to some aspects of the present disclosure.

The drawings are not necessarily to scale, or inclusive of all elements of a system, emphasis instead generally being placed upon illustrating the concepts, structures, and techniques sought to be protected herein.

DETAILED DESCRIPTION OF EMBODIMENTS

Systems and methods for collecting survey feedback are described herein. In some aspects of the disclosure, the feedback can be stored for future purposes (e.g., aggregation, evaluation, etc.). Survey data can be accepted in any format.

Figure 1:
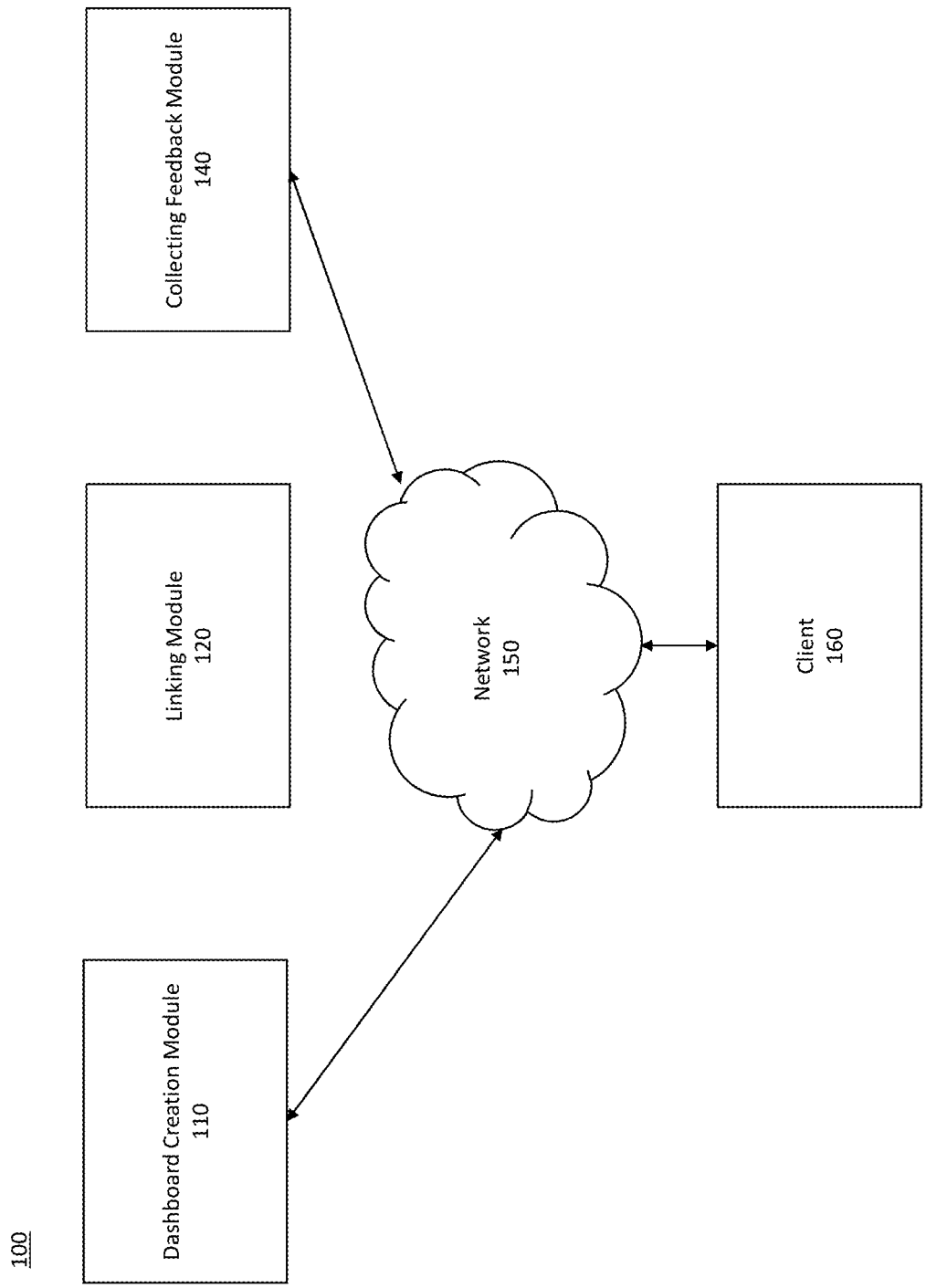
FIG. 1 is a diagram of an illustrative system for collecting survey feedback data, according to some aspects of the present disclosure.

FIG. 1 is a diagram of an illustrative system 100 for collecting survey feedback data, according to some embodiments of the present disclosure. Some feedback collection entities specialize in one type of format (e.g., email, user interface (UI)) but cannot receive feedback in more than one type of format. An entity may wish to accept and organize survey data from all these sources.

In some aspects of the disclosure, survey data can be collected from: email, a web page, a mobile application, a third party survey provider (e.g., survey monkey), or any other source, or any combination thereof.

An application programming interface (API) dashboard can be provided to the user so that the user can control the look and feel of the survey. Different data types can be collected to provide scoring information summarizing survey results. The system can be API-based (e.g., as opposed to a package that a feedback provider would provide in a certain format (e.g., JAVA script; software development kit (SDK) based). Because it is API based, a user can build it themselves within their internal company or entity (e.g., web site) and can analyze the data more easily. The user can also control how the survey feedback form is branded and looked.

In some aspects of the disclosure, once the data is collected, a table can be built around that data. For example, as shown in FIG. 1, a client 160 can access (e.g., over a network 150) an API-based survey feedback dashboard for storing survey feedback data from a dashboard creation module 110. A linking module 120 can send a link to the API-based survey feedback dashboard to a user providing the survey feedback data. The linking module 120 can also be used to collect the survey feedback data from the user by providing a link to the API-based survey feedback dashboard. The collecting feedback module 140 can be used to collect survey feedback data.

Figure 2:
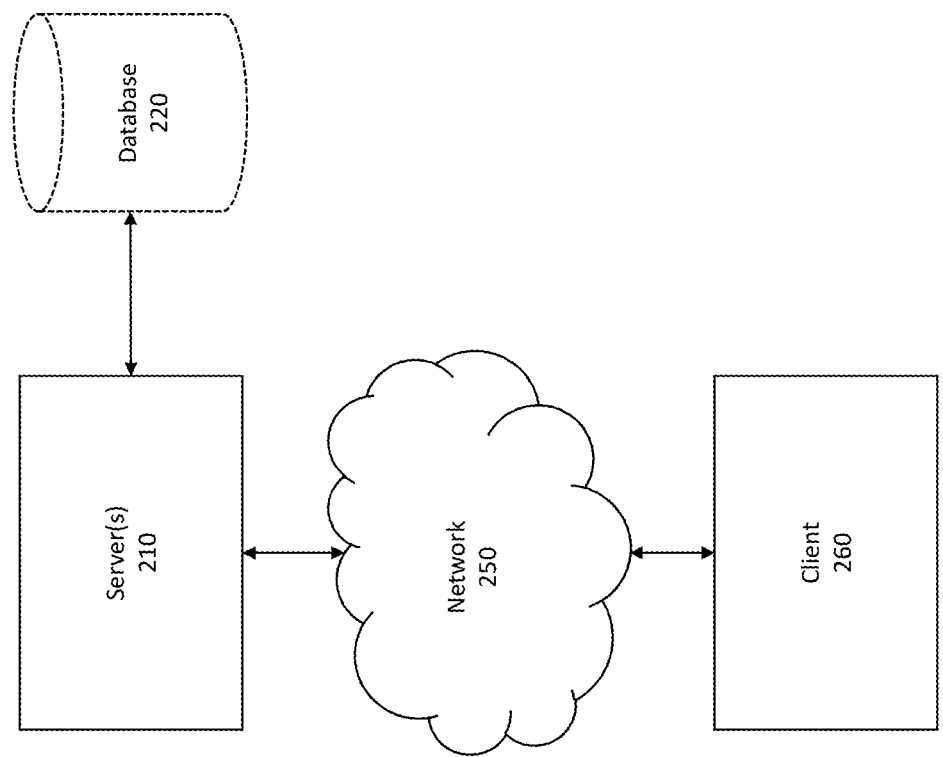
FIG. 2 is another diagram of an illustrative system for collecting survey feedback data, according to some aspects of the present disclosure.

FIG. 2 is a diagram of an illustrative system 200 for collecting survey feedback data, according to some embodiments of the present disclosure. A client 200 can communicate (e.g., thru a network 250) with a server 210. The server 210 can communicate with a database 220. In some embodiments, survey feedback data and/or the API-based survey feedback dashboards can be stored and/or updated in the database.

Figure 3:
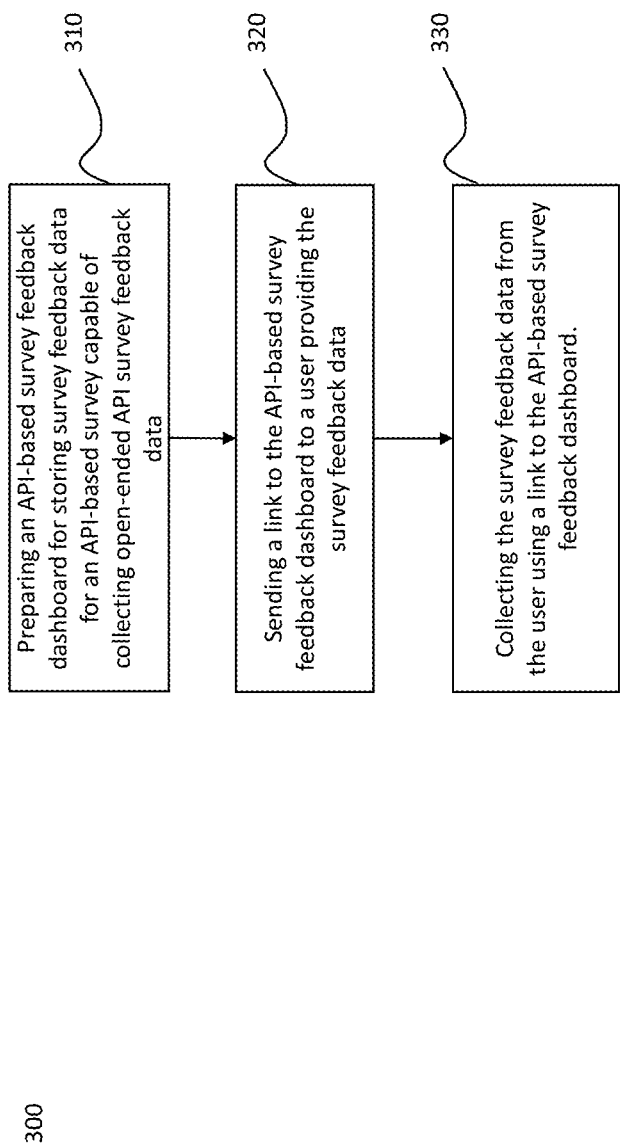
FIG. 3 is a flow diagram showing processing that may occur within the systems of FIGS. 1 and 2, according to some aspects of the present disclosure.

FIG. 3 is a flow diagram showing processing that may occur within the systems of FIGS. 1 and 2, according to some embodiments of the present disclosure. In step 310, an API-based survey feedback dashboard for storing survey feedback data for an API-based survey capable of collecting open-ended API survey feedback data can be prepared. In step 320, a link to the API-based survey feedback dashboard can be sent to a user providing the survey feedback data. In 330, the survey feedback data from the user can be collected using a link to the API-based survey feedback dashboard.

In some aspects of the disclosure, the API-based survey can include parameters that are used in the API-based survey feedback dashboard. The parameters can include: entity name, product or service name, user computer parameters, or feedback parameters, or any combination thereof.

In some aspects of the disclosure, survey feedback data in any computer format can be collected from the API-based survey. The survey feedback data can include: net promoter score (NPS) data, average ratings data (e.g., number of stars or 1-5 scale), yes/no data; thumbs up/thumbs down data, multiple choice data; open-ended answer to set questions; open-ended answers to open-ended questions; or drop down choice data; or any combination thereof.

In some aspects of the disclosure, a survey creator can manage a look and feel of the API-based survey feedback dashboard. An API-based survey feedback dashboard can be created for each product and/or service. Once survey feedback data is received, the system can determine whether an API-based survey feedback dashboard has been created for the survey feedback data for a survey. If no API-based survey feedback dashboard is found for a particular survey, a new API-based survey feedback dashboard can be created for that survey.

As an example, a user could receive an authorization code for an API-based survey feedback dashboard. At this point, the user can establish a team name, a company name, and a survey name. As soon as the user creates and posts the first survey (e.g., along with the survey parameters), the data can be pushed to the system so it can start preparing the dashboard with the data (e.g., tables with different kinds of information such as unique keys for the company name, etc.). In some embodiments, security measures (e.g., SIGNIN experience with double authentication, etc.) can be used.

Once the system received the survey, the system can look to see if there is already a dashboard created for the survey. If not, a new dashboard can be built (e.g., one dashboard per product.) If a dashboard already exists, data can be pulled from what is already in the file). Users can receive access to view and manage their surveys, dashboards, and survey data.

The system can generate a link on the platform where the user can send out the survey by email. The link can be sent to the user so they can access the platform. The platform can use their input and use the same API to build the dashboard. Thus, it can be email based as opposed to going to the user's web site. An external casing portal can be used instead of DEV.

The survey feedback data can also include survey taker user information (e.g., user identifying information; answered questions, how long it is taking the user to answer the questions or complete the survey, what operating system the user is using (e.g., Windows, Mac), whether the user is on a mobile device or web site, location of the user, what region the user is in, what time of day the survey is taken, or any other user information of interest to the entity providing the survey.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 410 in FIG. 4) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 4:
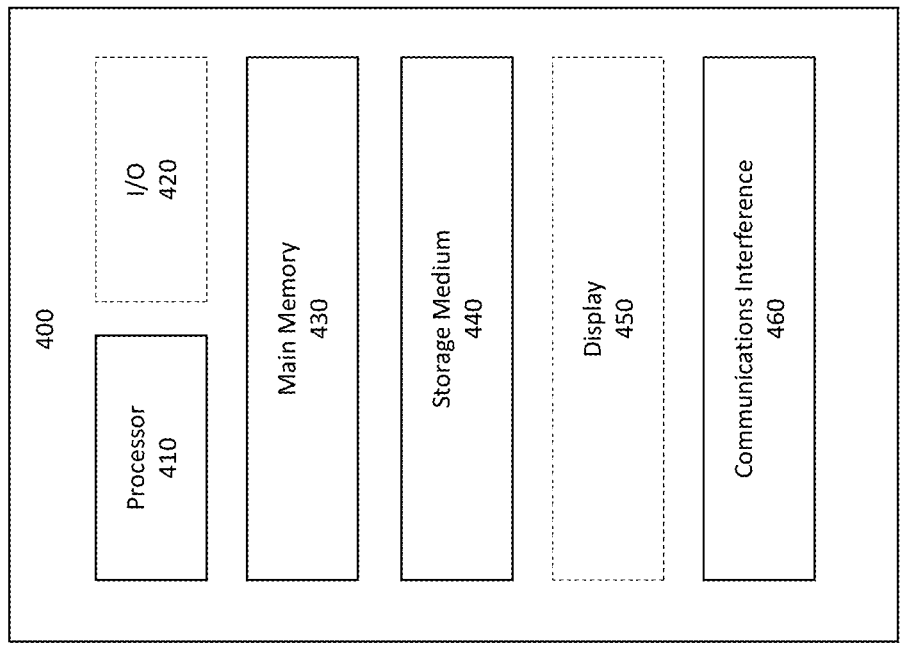
FIG. 4 illustrates an example computer, according to some aspects of the present disclosure.

FIG. 4 illustrates an example computer 405, according to some embodiments of the present disclosure. Computer 405 can include a processor 410 suitable for the execution of a computer program, and can include, by way of example, both general and special purpose microprocessors, and any one or more processor of any kind of digital computer. A processor can receive instructions and data from a memory 430 (e.g., a read only memory or a random access memory or both). Processor 410 can execute instructions and the memory 430 can store instructions and data. A computer can include, or be operatively coupled to receive data from or transfer data to, or both, a storage medium 440 for storing data (e.g., magnetic, magneto optical disks, or optical disks). Information carriers suitable for embodying computer program instructions and data can include all forms of nonvolatile memory, including by way of example semiconductor memory devices, such as EPROM, EEPROM, flash memory device, or magnetic disks. The processor 410 and the memory 430 can be supplemented by, or incorporated in, special purpose logic circuitry.

The computer 405 can also include an input/output 420, a display 450, and a communications interface 460.

EXAMPLE SCREEN SHOTS

FIGS. 5-8 illustrate example user interface screen shots, according to aspects of the invention. FIG. 5 illustrates an example screen shot that can provide educational information on a feedback collection tool. This can be used, for example, to: gauge customer loyalty, identity potential issues, improve product functionality, build customer relationships, etc. The feedback collection tool can be used to engage customers to gather feedback information. The feedback can be captured and reviewed using a variety of tools. The real-time analytics and/or real-time communication can be used to improve products and/or services.

Figure 6:
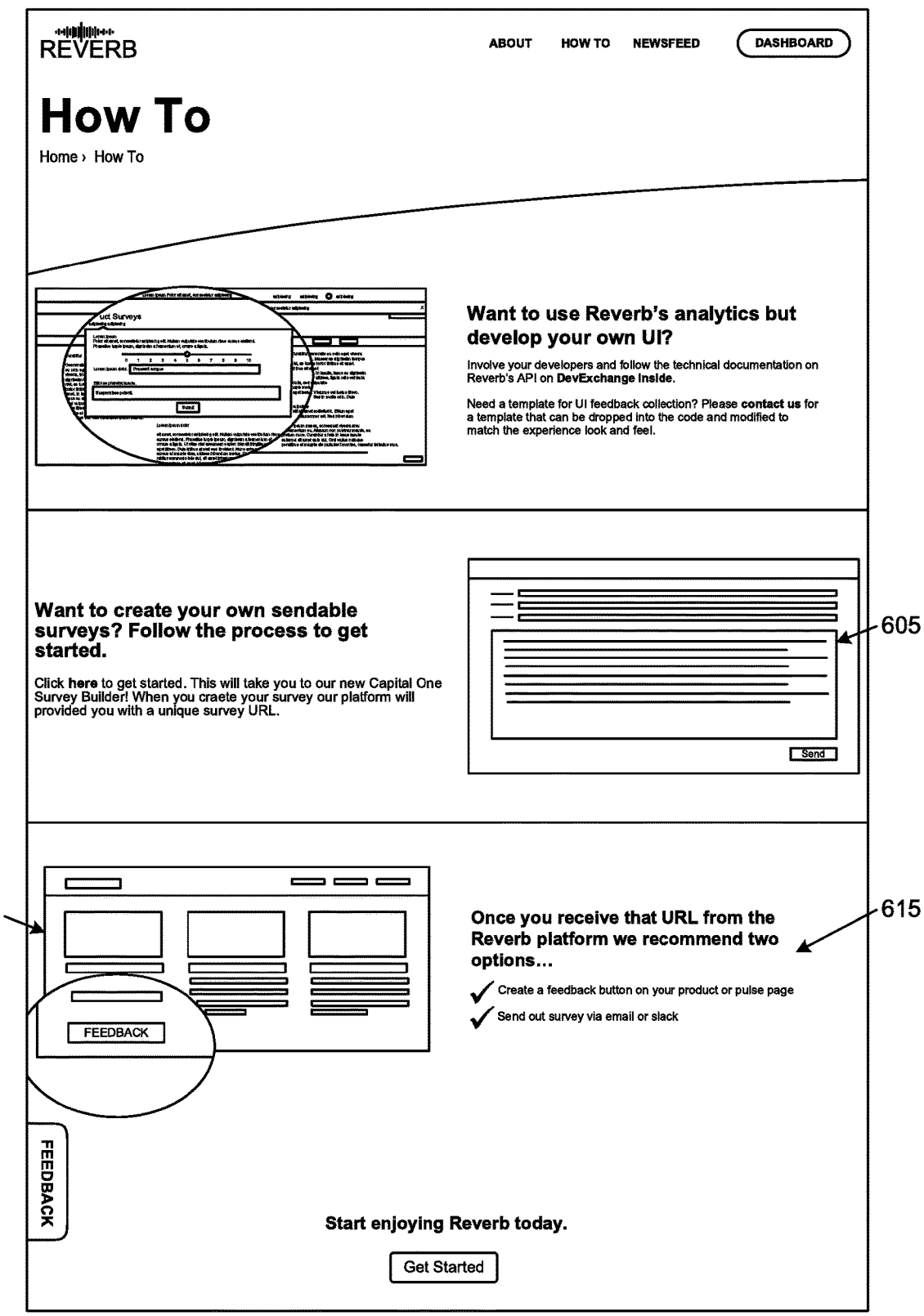
FIG. 6 is an example screen shot that can show users how to create their own survey, according to some aspects of the present disclosure.

FIG. 6 illustrates an example screen shot that can show users how to create their own survey. In 605, a user can be taken to a survey builder that allows the user to create and customize their own survey and then obtain a unique survey URL for their survey. In 610, a user can also create their own user interface (UI) using their own developer contact(s) that can follow the technical documentation. In addition, one or more templates for the UI feedback collection can be provided. These templates can be dropped into the code and modified to match the experience look and feel. Once the user receives the URL for their survey, in 615, the user can be directed to create a feedback button on their product, pulse page, web site, etc. In addition, the survey can be sent via email, stack, etc.

FIG. 7 is a screen shot that indicates that the customizable survey builder can include a net promoter score (NPS) and/or system usability scale (SUS) self-serve features. In 705, the user is provided with information on many different kind of questions that can be used when creating the survey, including but not limited to: drop down, open ended, yes/no, multiple choice, single choice, or any combination. In some aspects of the disclosure, the user can have complete control over the survey experience. In 710, it is shown that the survey can have an anonymity option provided during the survey creation process. In 715, it is shown that access control can be provided to help ensure product survey security on the platform. This security feature can require users to request access for individual surveys. There are two types of access, a read-only access, and administrative access. Administrative access can view and respond to customer feedback on the dashboard. This will help ensure that only those individuals that are approved can view or change the survey. In 720, it is shown that with administrative access, a user can also respond to individual feedback responses (e.g., to ask clarification, to thank).

Other options that can be provided include an export date button on the dashboard that can allow users to download their survey results (e.g., to a CSV file). Survey creators can also automatically gain access to their surveys and may not have to request access to their surveys. In 725, it is shown that users can upload/modify recipient lists and send surveys from the platform. Metrics can also be tracked from the platform, including, but not limited to: response rates, who has/hasn't responded to a particular survey, or ability to send out reminders to those who haven't responded, or any combination thereof. Filters can also be provided on the dashboard, which can include, but are not limited to: survey types, survey score, user name, or feedback timestamp, or any combination thereof. Tips on sending reminders or the NPS can also be provided.

Other information can also be provided, such as how to request access or how to reply to user feedback. In 730, it is shown that in order to request access, the user can search for their team name on the dashboard homepage. The product that the user wishes to request access to can be located and chosen. The user can choose read only or administrative access, fill out a description of why the user needs access (optionally), and submit the request.

In 735, it is shown that in order to provide feedback, the user can navigate to the product's feedback page, select the feedback response the user wishes to reply to, choose to reply, and write a reply and send the reply. In some embodiments, the reply can be chosen from some prepared reply options (e.g., thanks, a contact phone number to call for more information, etc.).

FIG. 8 illustrates a screen shot that can provide users additional information on the dashboard. In 805, it is shown that different avenues can be used to provide the resume system: a code snippet can be added to a webpage and/or email in some embodiments, or an API can be called, or any combination thereof.

Figure 9:
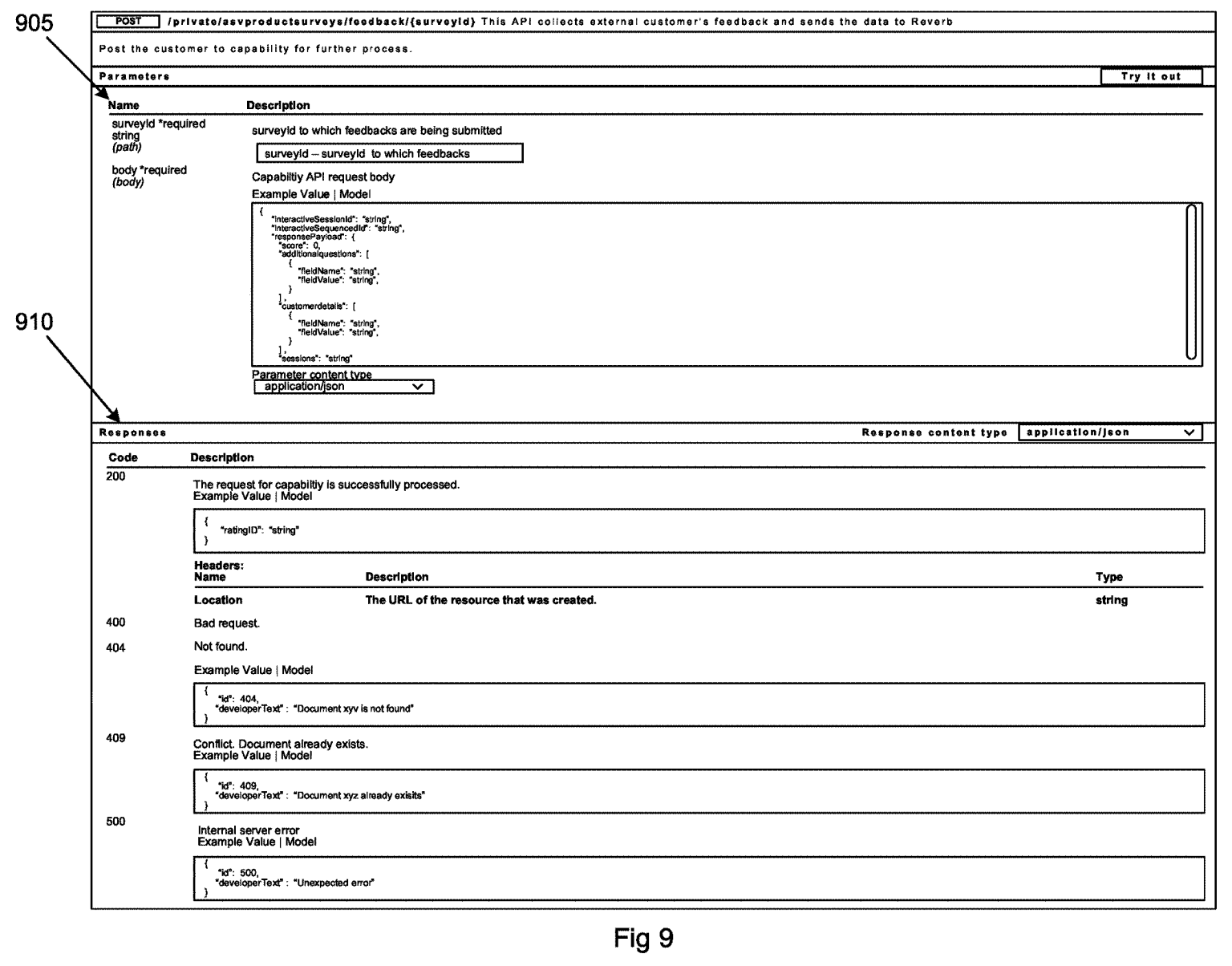

FIG. 9 illustrates a screen shot that shows an example API-based survey feedback dashboard for storing survey feedback data (in any format) for an API-based survey. The survey information and identification information can be generated using the information in this screen shot. The survey information can include the parameter information 905 (e.g., names and descriptions). For example, a surveyid, a string, and a body can be provided along with their descriptions. Some of these parameters can be required. The survey information can also include response codes and descriptions 910. Multiple examples of codes are provided in FIG. 9. The survey information can be saved to the database.

FIG. 10 illustrates an example link 1005 to an example survey 1010 that can be generated with the survey information. For example, the following link can be generated. https://reverb-qa.cloud.capitalone.com/survey/58a8b66d-c127-4d13-b7fd-5fca2c382641 The link can be sent to a survey responder through a desired channel. Once the survey responder fills out the survey, the survey feedback data can be sent back to the dashboard using the link to the API-based survey feedback dashboard shown in FIG. 10.

The following example pseudo code can be used to obtain survey feedback:

```
const SurveyResource = require('../../../resources/SurveyResource')
module.exports.put = async function (req, h) {
  try {
    const response = await
SurveyResource.publishSurveyFeedback(req.params.surveyId,
req.payload)
    return h.response(response).code(200)
  } catch (error) {
    return h.formatError(error)
  }
}
```

Figure 11:
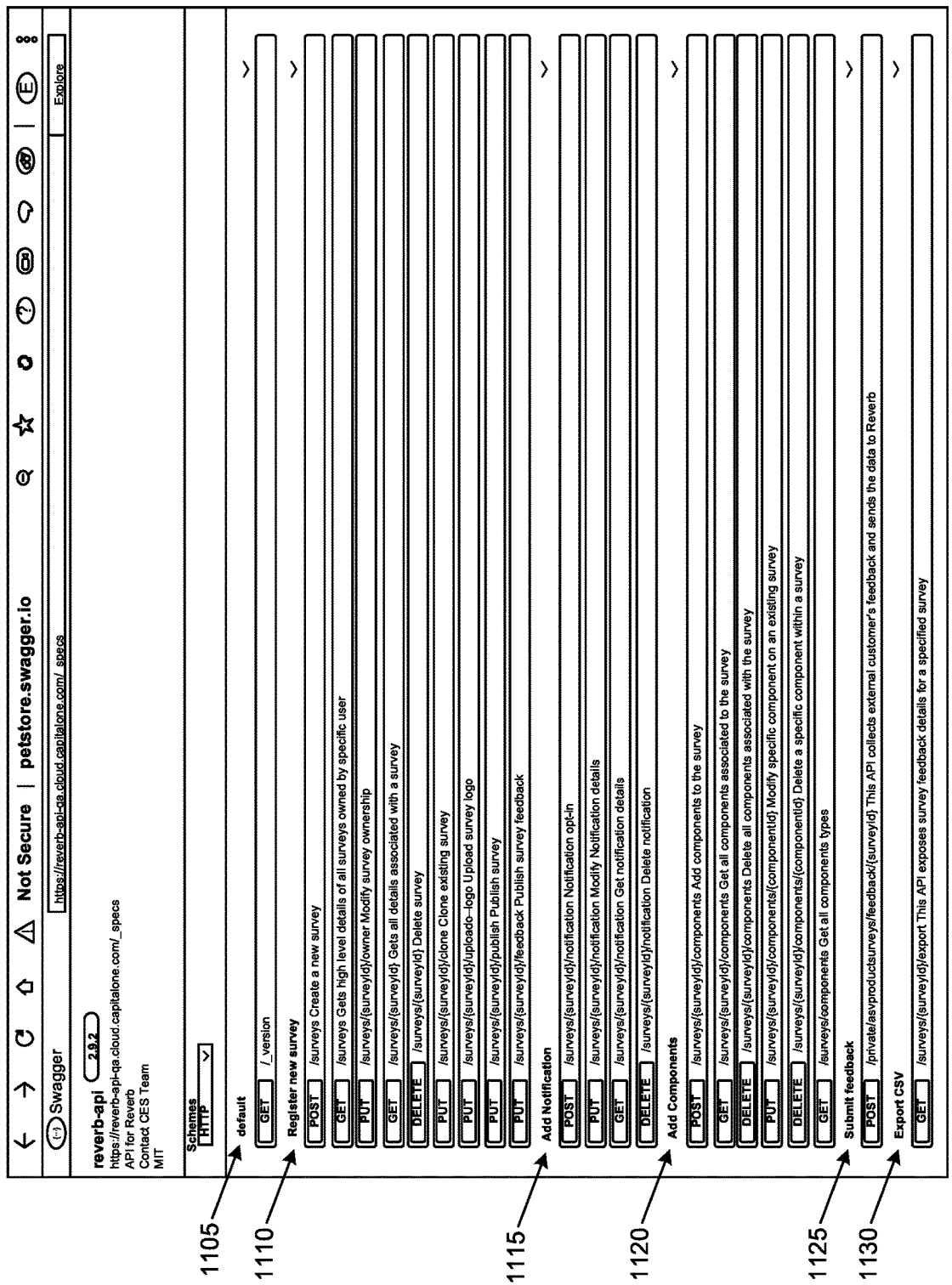
FIG. 11 illustrates example parameters for an API-based survey that can be used in the API-based survey feedback dashboard, according to some aspects of the present disclosure.

FIG. 11 illustrates example parameters for the API-based survey that can be used in the API-based survey feedback dashboard. The examples can include, but are not limited to: default 1105, register new survey 1110, add notification 1115, add components 1120, submit feedback 1125, and export CSV 1130.

Figure 12:
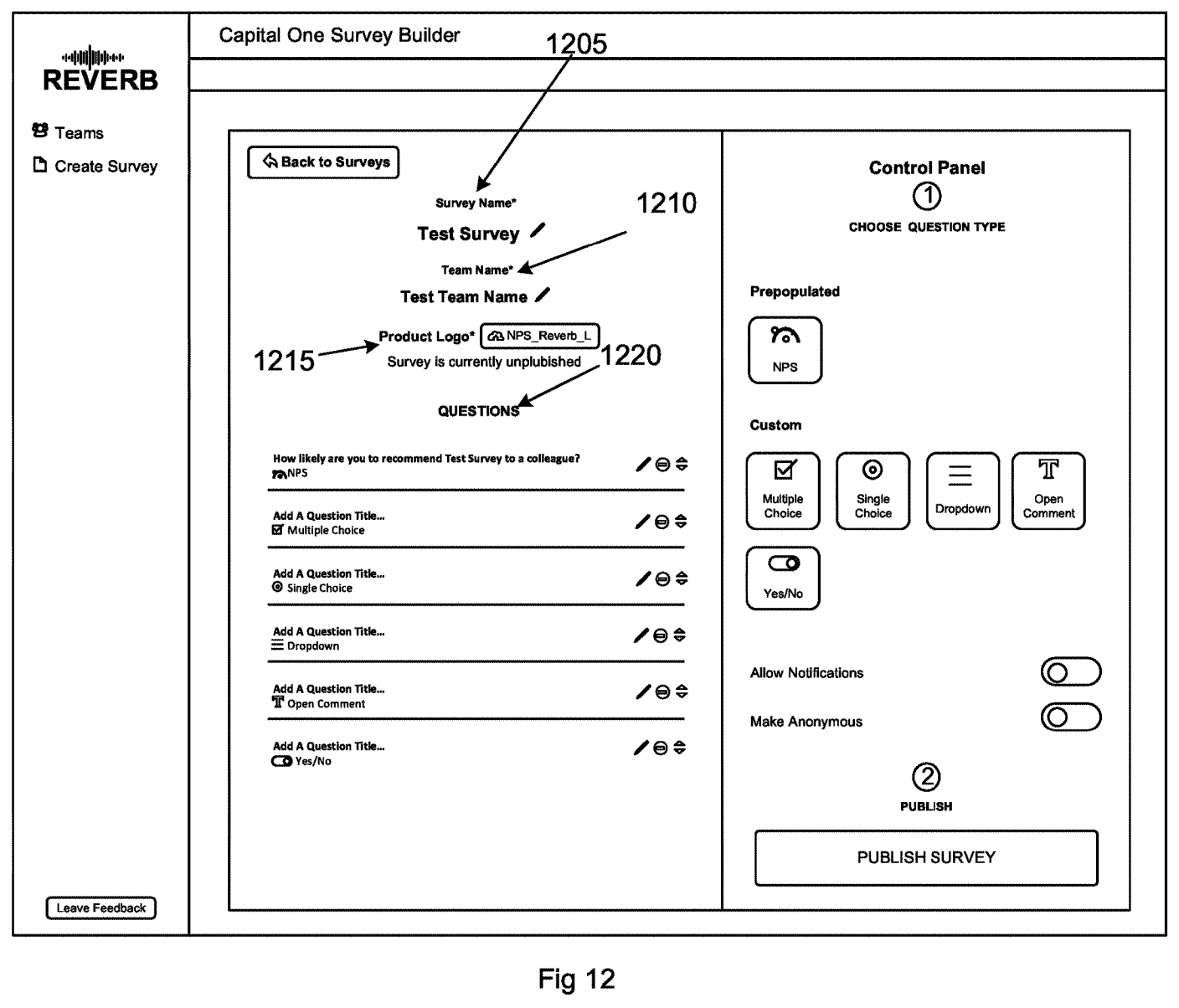

FIG. 12 illustrates an example of a survey creation screen shot. The following elements can be added: survey name 1205, team name 1210, product logo 1215, questions 1220.

Once the survey is created and sent, the survey feedback data can be received in any format. The following pseudocode illustrates how survey feedback data in any format received through the link (e.g., using a version of universally unique identifier (UUID)) can be processed.

```
module.exports.publishSurveyFeedback = async function
    (surveyId, data) {
  const feedbacks = [ ]
  try {
    const survey = new Survey({ survey_id: surveyId })
    await survey.read( )
    if (!survey.getData( )) {
      throw Boom.notFound(`Survey id ${surveyId} not found`)
    }
    for (const componentResponse of data.responses) {
      try {
        const feedback = new Feedback({
          survey_id: surveyId,
          component_id: componentResponse.component_id,
          feedback_id: Uuid.v4( ),
          answer: mapAnswer(componentResponse.response),
          e_id: data.customerDetails.eId,
          archive: 0
        })
        await feedback.create( )
        feedbacks.push(feedback)
      } catch (err) {
        throw err
      }
    }
    const response = await this.publishSurveyFeedbackLegacy(feedbacks,
data, survey)
    return {
      published: true,
      legacy_rating_id: _.get(response, 'ratingId'),
      feedback_ids: feedbacks.map((feedback) => feedback.getFeedbackId(
      ))
    }
  } catch (error) {
    Logger.err('publishSurveyFeedback')
    Logger.err(error)
    if (Boom.isBoom(error)) {
      throw error
    }
    const possibleCodesMap = {
      409: Boom.conflict,
      404: Boom.notFound,
      500: Boom.badImplementation
    }
    throw _.get(possibleCodesMap, _.get(error, 'statusCode', 500),
possibleCodesMap['500'])(error.message)
  }
}
```

Figure 13:
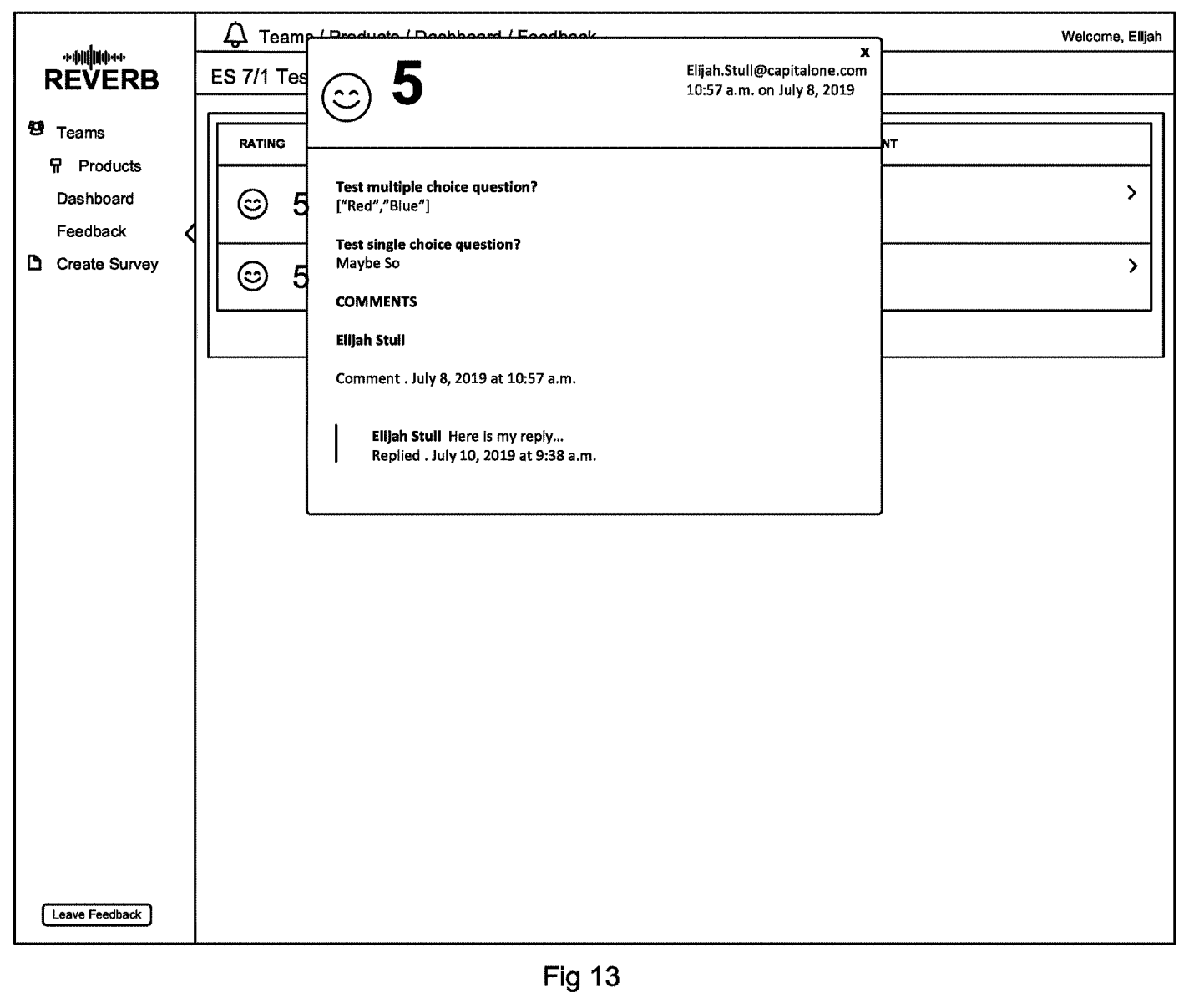

FIG. 13 illustrates an example of a survey dashboard screen shot showing example questions and comments. For example, questions can be asked to the survey creator user to determine what kinds of questions the user wishes to ask. In addition, comments can be made regarding the survey.

Figure 14:
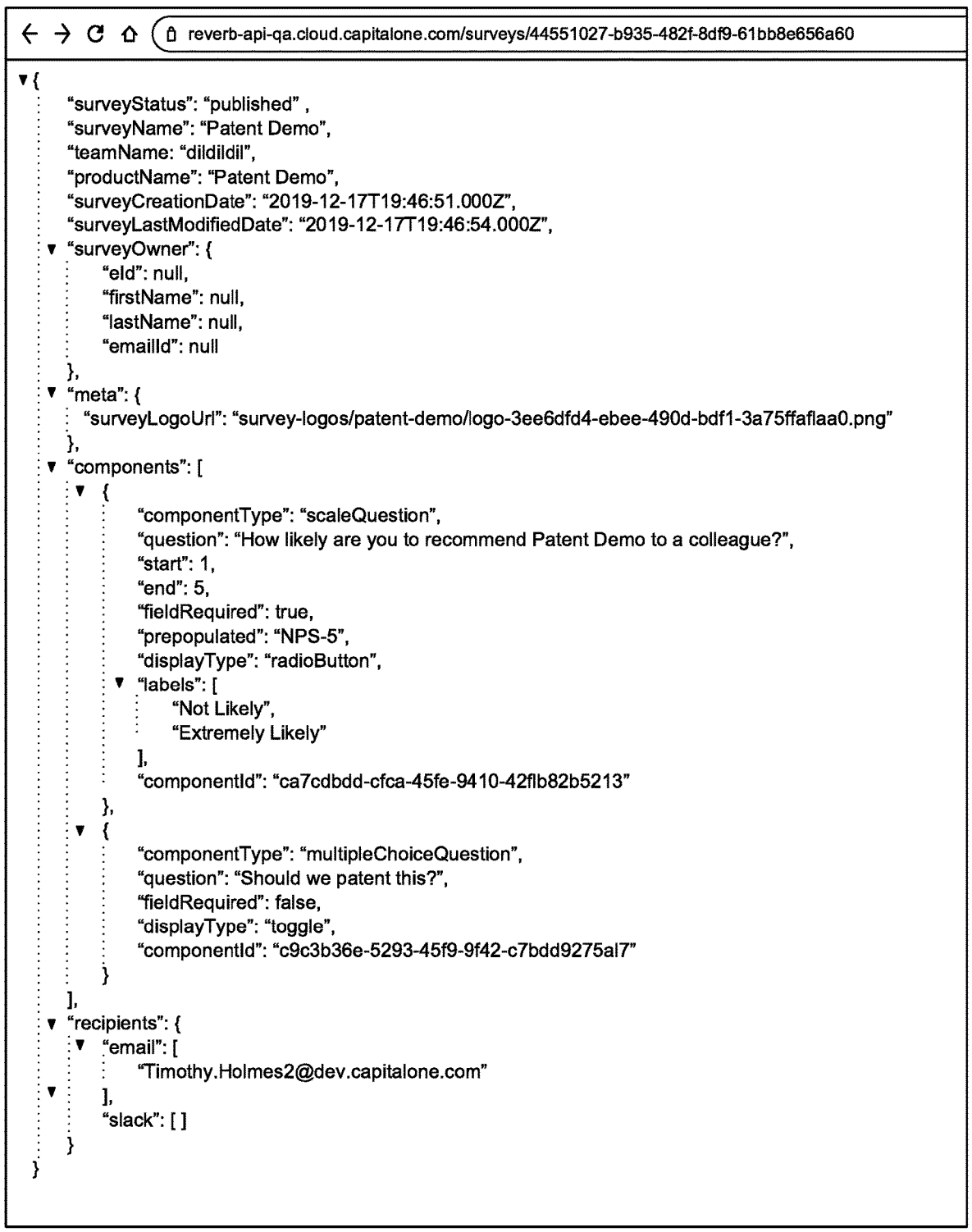
FIG. 14 illustrates example code for an API response for pulling information about a survey, according to some aspects of the present disclosure.

FIG. 14 illustrates example code for an API response for pulling information about a survey. The code illustrates example meta information, and example structural information. Example meta information can include: survey name, team name, product name, whether to anonymize user data (e.g., true or false), logo url, whether to provide notifications (e.g., true or false), or owner information, or any combination thereof. Example structural information can include: an amount of questions, question types, multiple choice options, required questions, or optional questions, or any combination thereof. The structural information can be contained in the components level.

CONCLUSION

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter. For example, the steps and/or limitations in the specification, drawings, and/or claims may be performed in an order other than the order set forth in the specification, drawings, and/or claims.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for collecting survey feedback data utilizing a computer device comprising a processor and a storage device, the method comprising:
   operating the processor to prepare an application programming interface (API)-based survey feedback dashboard on a server for storing the survey feedback data for an API-based survey, the API-based survey feedback dashboard capable of collecting the survey feedback data comprising at least two of single choice feedback data, multi choice feedback data, and free form feedback data;
   operating the processor to prepopulate and generate the API-based survey using field information from survey meta information and survey structural information of the API-based survey feedback dashboard;
   operating the processor to send the API-based survey to multiple users using a universally unique identifier (UUID) link that links the field information from the survey meta information and the survey structural information of the API-based survey feedback dashboard with the API-based survey;
   operating the processor to accept at the API-based survey feedback dashboard, using the UUID link, the survey feedback data received in any format via at least two channels, wherein each channel uses the computer device, and wherein the survey feedback data corresponds to the field information and the survey structural information; and
   using the storage device to store the survey feedback data on the API-based survey feedback dashboard.

2. The method of claim 1, wherein the computer device is a mobile computer device or a non-mobile computer device.

3. The method of claim 2, wherein the at least two channels comprise: an email format, a web page, a mobile application, or a third party service provider, or any combination thereof.

4. The method of claim 1, wherein the API-based survey feedback dashboard comprises filters comprising: survey types, survey score, user name, or feedback timestamp, or any combination thereof.

5. The method of claim 1, wherein the API-based survey feedback dashboard tracks metrics comprising: response rate information, which users have responded to a particular survey, or response reminder information, or any combination thereof.

6. The method of claim 1, the API-based survey comprising parameters that are used in the API-based survey feedback dashboard, the parameters comprising: entity name, product or service name, user computer parameters, or feedback parameters, or any combination thereof.

7. The method of claim 1, wherein the API-based survey feedback dashboard is created for each product and/or service.

8. The method of claim 1, comprising:
   operating the processor of the computer device to receive the survey feedback data and determining that the API-based survey feedback dashboard has not been created for the survey feedback data for a survey.

9. A system for collecting feedback data comprising:
   a computer device comprising:
     a memory storing instructions; and
     a processor for executing the instructions, the processor configured for:
       operating the processor of the computer device to prepare an application programming interface (API)-based survey feedback dashboard on a server for storing survey feedback data for an API-based survey, the API-based survey feedback dashboard capable of collecting the survey feedback data comprising: single choice feedback data, multi choice feedback data, and free form feedback data;
       operating the processor of the computer device to prepopulate and generate the API-based survey using field information from survey meta information and survey structural information of the API-based survey feedback dashboard;
       operating the processor of the computer device to send the API-based survey to multiple users using a universally unique identifier (UUID) link that links the field information from the survey meta information and the survey structural information of the API-based survey feedback dashboard with the API-based survey;
       operating the processor of the computer device to accept at the API-based survey feedback dashboard, using the UUID link, the survey feedback data received in any format via at least two channels, wherein each channel uses the computer device, and wherein the API-based survey feedback data corresponds to the field information and the survey structural information; and
       operating the processor of the computer device to store the survey feedback data on the API-based survey feedback dashboard.

10. The system of claim 9, the API-based survey comprising parameters that are used in the API-based survey feedback dashboard.

11. The system of claim 10, wherein the parameters comprise: entity name, product or service name, user computer parameters, or feedback parameters, or any combination thereof.

12. The system of claim 9, wherein version 1, 2, 3, or 4 UUID data is used.

13. The system of claim 9, the processor configured for enabling a survey creator to manage a look and feel of the API-based survey feedback dashboard.

14. A computer-implemented method for collecting survey feedback data utilizing a computer device comprising a processor and a storage device, the method comprising:
   operating the processor to create an application programming interface (API)-based survey feedback dashboard for storing the survey feedback data for an API-based survey, the API-based survey comprising parameters that are used in the API-based survey feedback dashboard, the API-based survey feedback dashboard capable of collecting the survey feedback data comprising at least two of: single choice feedback data, multi choice feedback data, and free form feedback data;

operating the processor to prepopulate and generate the API-based survey using field information from survey meta information and survey structural information of the API-based survey feedback dashboard operating the processor to send the API-based survey to multiple users using a universally unique identifier (UUID) link that links the field information from the survey meta information and the survey structural information of the API-based survey feedback dashboard with the API-based survey;

operating the processor to accept, at the API-based survey feedback dashboard, using the UUID link, the survey feedback data from the multiple users, the survey feedback data received in any format from the multiple users using at least two channels, wherein the survey feedback data corresponds to the field information from the survey meta information and the survey structural information; and using the storage device to store the survey feedback data on the API-based survey feedback dashboard.

15. The method of claim 14, wherein the parameters comprise: entity name, product or service name, user computer parameters, or feedback parameters, or any combination thereof.

16. The method of claim 14, wherein version 1, 2, 3, or 4 UUID data is used.

17. The method of claim 14, wherein a user manages a look and feel of the API-based survey feedback dashboard.

18. The method of claim 14, wherein the survey feedback data also comprises: net promoter score (NPS) data, average ratings data, yes/no data; thumbs up/thumbs down data, multiple choice data; or drop down choice data; or any combination thereof.

19. The method of claim 14, wherein the API-based survey feedback dashboard is created for each product and/or service.

20. The method of claim 14, comprising:

operating the processor of the computer device to receive the survey feedback data and determining that the API-based survey feedback dashboard has not been created for the survey feedback data for a survey.

21. The method of claim 1, comprising:

storing a plurality of logic flows on a computer-readable storage device of the computer device;

for each logic flow, storing corresponding instructions on the computer-readable storage device for using the survey feedback data.

* * * * *